United States Patent [19]

Reed et al.

[11] Patent Number: 4,543,224

[45] Date of Patent: * Sep. 24, 1985

[54] POLYMER STABILIZATION

[75] Inventors: Jerry O. Reed; Ronald D. Mathis, both of Bartlesville, Okla.

[73] Assignee: Phillips Petroleum Company, Bartlesville, Okla.

[ * ] Notice: The portion of the term of this patent subsequent to Feb. 28, 2001 has been disclaimed.

[21] Appl. No.: 576,979

[22] Filed: Feb. 3, 1984

Related U.S. Application Data

[63] Continuation of Ser. No. 377,233, May 11, 1982, Pat. No. 4,434,122.

[51] Int. Cl.$^4$ ............................ C08K 5/20; C08K 5/13; C08K 5/10
[52] U.S. Cl. ..................................... 264/211; 524/223; 524/291
[58] Field of Search .................. 264/209.6, 210.6, 211; 528/388; 428/419; 524/291, 223, 343, 349, 350, 351

[56] References Cited

U.S. PATENT DOCUMENTS

| | | | |
|---|---|---|---|
| 3,584,047 | 6/1971 | Dexter et al. | 524/222 |
| 3,658,753 | 4/1972 | Reed et al. | 524/609 |
| 3,884,873 | 5/1975 | Short | 524/291 |
| 3,930,078 | 12/1975 | Short | 427/388 |
| 4,303,781 | 12/1981 | Idel et al. | 524/388 |

Primary Examiner—Veronica P. Hoke
Attorney, Agent, or Firm—Howard D. Doescher

[57] ABSTRACT

The heat stability of arylene sulfide resins, such as poly(p-phenylene sulfide) resin, is improved by the addition of cure retarders comprising phenolic amide or ester-based antioxidants. The resin compositions of the invention are particularly applicable for reducing gel formation during melt extrusion.

15 Claims, No Drawings

POLYMER STABILIZATION

FIELD OF INVENTION

This is a continuation application of our copending application having Ser. No. 377,233, filed May 11, 1982, now U.S. Pat. No. 4,434,122, entitled POLYMER STABILIZATION, now allowed.

This invention relates to improving the characteristics of arylene sulfide polymer compositions. In accordance with another aspect, this invention relates to the use of cure retarders in poly(arylene sulfide) resin compositions. In accordance with another aspect, this invention relates to the use of cure retarders or heat stabilizers in poly(arylene sulfide) resin compositions to prevent cross-linking or substantial alternation of physical properties during heating. In accordance with a further aspect, this invention relates to the use of selected stabilizers to improve the heat stability of arylene sulfide polymer compositions, especially poly(p-phenylene sulfide) resins. In accordance with a further aspect, this invention relates to improving the heat stability of fiber and film grade poly(p-phenylene sulfide) resins by the addition of a cure retarder or stabilizer. In accordance with still another aspect, this invention relates to the use of stabilizers that reduce gel formation of arylene sulfide resins when subjected to heating while processing, for example, during the melt spinning of arylene sulfide resin compositions to produce fibers.

BACKGROUND OF THE INVENTION

In applications, such as in the production of fibers and films from arylene sulfide polymers, it is desirable that the melt flow and molecular weight of the polymer remain substantially unchanged during processing of the polymer. Various procedures have been utilized to stabilize arylene sulfide polymers against changes in physical properties during processing. It has now been discovered that arylene sulfide polymers can be treated in a manner such that the polymer properties remain substantially unchanged during heating of the polymer by incorporating into the polymer a cure retarder.

Accordingly, an object of this invention is to provide a process for improving the heat stability of arylene sulfide polymers.

A further object of this invention is to provide an improved process for stabilizing the physical properties, especially melt flow and molecular weight, of arylene sulfide resins during processing.

A further object of this invention is to provide phenylene sulfide polymers having improved physical properties with respect to melt flow and molecular weight, in particular.

A further object of this invention is to provide phenylene sulfide polymers exhibiting improved heat stability.

Other objects, aspects, and the several advantages of the invention will be apparent to those skilled in the art upon a study of the specification and the appended claims.

SUMMARY OF THE INVENTION

According to the invention, the heat stability of arylene sulfide resins is improved by the addition of an effective stabilizing amount of at least one phenolic amide or ester-based antioxidant which retards curing and cross-linking of the resin during heating.

In accordance with another embodiment of the invention, the heat stability of poly(arylene sulfide) resins, for example, poly(p-phenylene sulfide) resins, is improved by incorporating therein prior to heating to processing conditions an effective stabilizing amount of at least one phenolic amide or ester-based antioxidant to retard curing and cross-linking during heating and processing of the polymer.

In accordance with still another embodiment of the invention, the heat stability of fiber and film grade poly(p-phenylene sulfide) polymers is improved by the addition of a phenolic amide or ester-based antioxidant.

In accordance with a further specific embodiment of the invention, the addition of a phenolic ester-based antioxidant to arylene sulfide polymer resin composition reduces the amount of gel formed during melt extrusion of the polymer composition, thereby minimizing plugging of filters and spinnerets which ordinarily cause premature shut-downs and additional clean-up operations.

DESCRIPTION OF THE PREFERRED EMBODIMENTS

The invention is applicable for use with any normally solid, heat curable, high molecular weight arylene sulfide polymer that can be formed into fiber and film. Arylene sulfide polymers which can be employed in the process of this invention include arylene sulfide polymers which have a melt flow of at least about 20 and generally within the range of about 50 to about 400 and higher (determined by the method of ASTM D 1238-70, modified to a temperature of 316° C. using a 5-kg weight, the value being expressed as g/10 min.). Thus, the arylene sulfide polymers can be linear, branched or lightly cross-linked. Although the method by which the polymers of this description are produced is not critical, preferably the polymer employed in the process is prepared by use of polyhalo aromatic compounds, alkali metal sulfides, and organic amides. The preferred type polymer employed for use in fiber and film applications is prepared by use of a p-dihalobenzene, an alkali metal sulfide, an organic amide, and an alkali metal carboxylate as in U.S. Pat. No. 3,919,177. The disclosure of U.S. Pat. No. 3,919,177 is hereby incorporated by reference.

The phenolic amide or ester-based antioxidant compounds used as cure retarders and heat stabilizers according to the invention can be represented by the following structure

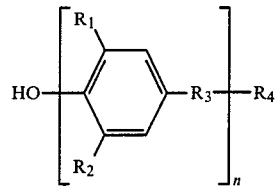

where $R_1$ and $R_2$ can be an alkyl radical having from 1 to about 6 carbon atoms and $R_1$ and $R_2$ can be the same or different radicals; $R_3$ can be represented by the structures

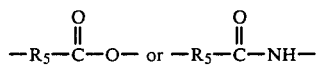

where $R_5$ can be any alkylene or alkylidene radical having 1 to about 6 carbon atoms; $R_4$ can be $R_5$ or any alkyl radical having 1 to about 20 carbon atoms; and n is 1 when $R_4$ is an alkyl radical having 1 to about 20 carbon atoms, or n is 2 when $R_4$ is $R_5$.

Representative compounds of the type described above include octadecyl 3-(3',5'-di-tert-butyl-4'-hydroxyphenyl)propionate, decyl 3-(3',5'-di-tert-butyl-4'-hydroxyphenyl)propionate, octyl 2-(3',5',di-tert-amyl-4'-hydroxyphenyl)acetate-ethyl 4-(3',5',-di-n-butyl-4'-hydroxyphenyl)butyrate-hexyl 6-(3',5',-di-n-hexyl-4'-hydroxyphenyl)hexanoate-N,N'-hexamethylene bis(3,5-di-tert-butyl-4-hydroxyhydrocinnamamide), N,N'-hexamethylene bis(3,5-tert-amyl-4-hydroxyhydrocinnamamide), N,N'-methylene bis(3,5-propyl-4-hydroxyhydrocinnamamide), N,N'-tetramethylene bis(3,5-hexyl-4-hydroxyhydrocinnamamide), and the like and mixtures thereof.

The amount of cure retarder incorporated into the arylene sulfide resin will be a finite, effective amount sufficient to improve the heat stability of the polymer. In general, the cure retardant additives of this invention are employed in an amount within the range of about 0.1 to about 5, preferably about 0.5 to about 2 weight percent based on the weight of the arylene sulfide polymer.

In addition to the cure retardant additives of this invention, the compositions can contain other ingredients conventionally employed in arylene sulfide polymer compositions formed into fibers and films. For instance, fillers such as zinc oxide, pigments, resins, and/or plasticizers, and the like, can be present so long as the particle size is small enough to permit passage of the polymer through the processing equipment during formation of fibers and films.

The cure retarder can be incorporated into the arylene sulfide polymer at any stage of processing, preferably prior to being subjected to elevated temperature, or at such times as it is desired to retain heat stability. In one practical application of the invention, the cure retarders are incorporated into the arylene sulfide resin, such as a poly(p-phenylene sulfide) resin, prior to melt spinning to form fibers or other formed articles so that gel formation is reduced during melt spinning and problems with filter and spinneret plugging is reduced or obviated.

The processes of this invention of incorporating the cure retarder into the resin can be conducted batchwise or continuously.

The following examples are intended to illustrate the compositions and process of the invention.

EXAMPLE I

This example describes the procedure used to prepare and test samples disclosed herein. The example is also a control giving the results of poly(p-phenylene sulfide) polymer without an additive. About 10 grams of poly(p-phenylene sulfide) powder (Mw about 28,000, melt flow 324 grams per 10 mins. using 5-kg wt. at 316° C.) produced by the method described in U.S. Pat. No. 3,919,177 was treated with about 40 milliliters acetone solvent and dried at ambient room temperature for about 48 hours. The dried powder was compression molded into disc specimens, 2.5 grams each being 1 inch in diameter × 0.1875 inch thick. The molding procedure was 10,000 psig for 5 minutes at about 24° C., 10,000 psig for 2.5 minutes at 325° C., 30,000 psig for 2.5 minutes at 325° C., and cooling under pressure to below 120° C. before removal. The molded disc specimens were evaluated by determining storage modulus as a function of time. Storage modulus is very sensitive to cross-linking and increases in molecular weight and as such is useful in determining heat stability of poly(phenylene sulfide). The test is carried out on a Rheometric Dynamic Spectrometer (RDS) available from Rheometrics, Inc., which comprises two 1 inch diameter stainless steel plates, the bottom plate connected to a sensing device and the top plate able to oscillate horizontally. The sample to be tested is placed between the plates which have been preheated to 300° C. (572° F.). As the sample begins to melt, it is squeezed to a thickness of 2 mm. Excess material is removed and the sample allowed to thermally equilibrate for 3 minutes. The top plate is then oscillated at 10 radians per second with 10 percent strain. Readings are recorded every minute for 20 minutes. In this manner the RDS storage modulus after 6 minutes was determined as 1890 dynes per square centimeter. After 20 minutes RDS storage modulus was 4960 dynes per square centimeter. Thus, the percent difference in storage modulus between 6 and 20 minutes was 162 percent.

EXAMPLE II

This is a control run demonstrating the ineffectiveness of some known stabilizers to retard curing when used in polyphenylene sulfide polymers. The procedure for sample preparation and evaluation described in Example I was repeated except that 0.1 gram of bis(4-t-butyl-3-hydroxy-2,6-dimethylbenzyl)dithiol terephthalate (Cyanamid 1729) dissolved in 40 milliliters of acetone was added to the poly(phenylene sulfide) powder before the initial drying. The additive and poly(phenylene sulfide) powder mixture was periodically stirred during a 48 hour ambient run temperature drying period. The procedure was repeated with another additive solution, namely, 0.1 gram of N,N'-diphenyl-p-phenylenediamine (Naugard J) dissolved in 40 milliliters of acetone. The testing results indicate neither of the known stabilizer additives was effective in reducing gel formation (cross-linking or increased molecular weight) as determined by RDS storage modulus. The terephthalate additive had a storage modulus of 2030 dynes/cm$^2$ at 6 minutes, 5710 dynes/cm$^2$ at 20 minutes with a 181 percent change. The amine stabilizer additive had a storage modulus of 2050 dynes/cm$^2$ at 6 minutes, 5400 dynes/cm$^2$ at 20 minutes with a 163 percent change.

EXAMPLE III

This example is an inventive run demonstrating the effectiveness of certain hindered phenols in retarding the cure of poly(p-phenylene sulfide). The procedure for sample preparation and evaluation described in Example I was repeated except that 0.1 gram (1 weight percent) of N,N'-hexamethylene bis(3,5-di-tert-butyl-4-hydroxyhydrocinnamamide) (Irganox 1098) dissolved in 40 milliliters of acetone was added to the poly(phenylene sulfide) powder before the initial drying. The additive of the poly(p-phenylene sulfide) powder mixture was periodically stirred during a 48 hour ambient run temperature drying period. The procedure was repeated with another known stabilizer, octadecyl 3-(3',5'-di-tert-butyl-4'-hydroxyphenyl)propionate (Irganox 1076) dissolved in 40 milliliters of acetone. The effect of these additives on RDS storage modulus is listed in Table I along with the controls from Examples I and II for comparison. The data indicate that not all known stabilizers are effective in retarding cure of poly(p-phenylene sulfide) polymer, see controls, Example II. However, the hindered phenols of the instant invention are effective in retarding cure of the poly(p-phenylene sulfide) polymer.

TABLE I
EFFECT OF HINDERED PHENOLS ON HEAT STABILITY (STORAGE MODULUS) OF POLY (P-PHENYLENE SULFIDE)

| Example No. | 1 wt. % Additive | RDS Storage Modulus, dynes/cm$^2$ 6 min. | 20 mins. | % Difference |
|---|---|---|---|---|
| Controls: | | | | |
| I | No additive | 1890 | 4960 | 162 |
| II | Bis(4-t-butyl-3-hydroxy-2,6-dimethylbenzyl)dithiol terephthalate[a] | 2030 | 5710 | 181 |
| II | N,N'—diphenyl-p-phenylenediamine[b] | 2050 | 5400 | 163 |
| Invention: | | | | |
| III | N,N'—Hexamethylene bis(3,5-di-tert-butyl-4-hydroyhydrocinnamide)[c] | 2410 | 3670 | 52 |
| III | Octadecyl 3-(3',5'-di-tert-butyl-4'-hydroxyphenyl)-propionate[d] | 2420 | 3910 | 62 |

[a]Cyanamid 1729 from American Cyanamid, white powder, mp 218–220° C.
[b]Naugard J from Uniroyal.
[c]Irganox 1098 from Ciba-Geigy, white powder, mp 156–161° C.
[d]Irganox 1076 from Ciba-Geigy, white powder, mp 50–55° C.

We claim:

1. In a process for producing film by melt extruding a poly(arylene sulfide) resin having a melt flow of about 50 to about 400, the improvement for reducing gel formation during melt extrusion which comprises incorporating into said resin an effective heat and melt flow stabilizing amount of at least one phenolic amide or ester-based stabilizer having the formula:

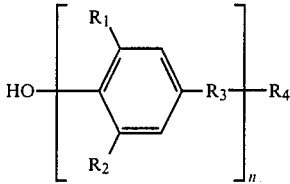

where $R_1$ and $R_2$ can be an alkyl radical having from 1 to about 6 carbon atoms and $R_1$ and $R_2$ can be the same or different radicals; $R_3$ can be represented by the structure

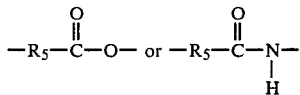

where $R_5$ can be any alkylene or alkylidene radical having 1 to about 6 carbon atoms, $R_4$ can be $R_5$ or any alkyl radical having 1 to about 20 carbon atoms, and n is 1 when $R_4$ is an alkyl radical having 1 to about 20 carbon atoms, or n is 2 when $R_4$ is $R_5$, which amount is sufficient to retard curing and cross-linking of said resin during melt extrusion and thereby minimize gel formation in the processing equipment.

2. A process according to claim 1 wherein said resin is a poly(p-phenylene sulfide) resin.

3. A process according to claim 1 wherein said resin is a poly(p-phenylene sulfide) resin and said phenolic amide or ester-based stabilizer is octadecyl 3-(3',5'-di-tert-butyl-4'-hydroxyphenyl)-propionate or N,N'-hexamethylene bis(3,5-di-tert-butyl-4-hydroxyhydrocinnamamide).

4. A process according to claim 1 wherein said poly(arylene sulfide) resin is an alkali metal carboxylate modified poly(p-phenylene sulfide).

5. In a process for producing film by melt extruding a poly(arylene sulfide) resin having a melt flow of about 50 to about 400, the improvement for reducing gel formation during melt extrusion which comprises incorporating into said resin an effective heat and melt flow stabilizing amount in the range of about 0.1 to about 5 weight percent based on the weight of the arylene sulfide stabilizer polymer of at least one of phenolic amide and phenolic ester-based compounds having the formula:

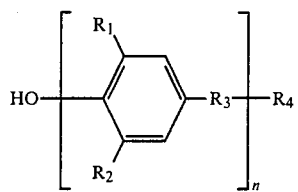

where $R_1$ and $R_2$ can be an alkyl radical having from 1 to about 6 carbon atoms and $R_1$ and $R_2$ can be the same or different radicals; $R_3$ can be represented by the structure

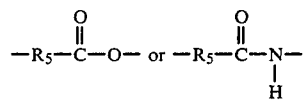

where $R_5$ can be any alkylene or alkylidene radical having 1 to about 6 carbon atoms, $R_4$ can be $R_5$ or any alkyl radical having 1 to about 20 carbon atoms, and n is 1 when $R_4$ is an alkyl radical having 1 to about 20 carbon atoms, or n is 2 when $R_4$ is $R_5$, which amount is sufficient to retard curing and cross-linking or substantial alternation of physical properties of said resin during melt extrusion as determined by Rheometric Dynamic Spectrometer (RDS) storage modulus and thereby minimize plugging of the processing equipment with gel.

6. A process according to claim 5 wherein said resin is a (poly-phenylene sulfide) resin.

7. A process according to claim 5 wherein said stabilizer is a phenolic amide compound.

8. A process according to claim 5 wherein said stabilizer is a phenolic ester-based compound.

9. A process according to claim 5 wherein the amount of stabilizer added ranges from about 0.5 to about 2 weight percent based on the weight of the arylene sulfide polymer.

10. A process according to claim 5 wherein said resin is a poly(p-phenylene sulfide) resin and said phenolic compound is octadecyl 3-(3',5'-di-tert-butyl-4'-hydroxyphenyl)propionate or N,N'-hexamethylene bis(3,5-di-tert-butyl-4-hydroxyhydrocinnamamide).

11. A process according to claim 5 wherein said poly(arylene sulfide) resin is an alkali metal carboxylate modified poly(p-phenylene sulfide) resin.

12. A process according to claim 6 wherein said stabilizer is a phenolic amide compound.

13. A process according to claim 6 wherein said stabilizer is phenolic ester-based compound.

14. A process according to claim 10 wherein said resin is an alkali metal carboxylate modified poly(p-phenylene)sulfide.

15. A film formed according to the process of claim 5.

* * * * *